May 31, 1955  M. DE J. ORTEGA  2,709,444
DISH WASHING APPARATUS
Filed Aug. 20, 1949  6 Sheets-Sheet 2

FIG. 3.

INVENTOR.
BY MARIO DE J. ORTEGA
ATTORNEY

May 31, 1955 M. DE J. ORTEGA 2,709,444
DISH WASHING APPARATUS
Filed Aug. 20, 1949 6 Sheets—Sheet 3

INVENTOR.
MARIO DE J. ORTEGA
BY
*AWinburn*
ATTORNEY

May 31, 1955  M. DE J. ORTEGA  2,709,444
DISH WASHING APPARATUS

Filed Aug. 20, 1949  6 Sheets-Sheet 4

INVENTOR.
BY MARIO DE J. ORTEGA

ATTORNEY

May 31, 1955     M. DE J. ORTEGA     2,709,444
DISH WASHING APPARATUS Filed Aug. 20, 1949     6 Sheets-Sheet 5

INVENTOR.
BY MARIO DE J. ORTEGA
ATTORNEY

United States Patent Office 2,709,444
Patented May 31, 1955

2,709,444

DISH WASHING APPARATUS

Mario De J. Ortega, Ashorakken Beach, N. Y.; Pauline A. Ortega, administratrix of said Mario De J. Ortega, deceased Application August 20, 1949, Serial No. 111,517

6 Claims. (Cl. 134—58)

This invention relates to automatically operated washing devices. More particularly, my invention is directed to an improved automatically operated dish washing apparatus.

One of the objects of my invention is to provide a highly improved dish washing apparatus of the class described, which shall be so constructed and arranged that the standard type of kitchen sink may be utilized as the washing chamber, the articles to be washed being arranged in a suitable holding tray and then placed in the sink, and in which a specifically designed cover is employed in such manner that the mere placing of the cover in position over the sink will automatically start the operation of the apparatus.

Another object of my invention is to provide a novel dish washing apparatus of the class described which shall be so designed that once it has been effectively started, it will automatically proceed through a predetermined cycle of operation to complete the washing operation, after which it will automatically stop to permit the removal of the washed dishes.

A further object of my invention is to provide a dish washing apparatus of the class described, in which highly improved means are employed for utilizing the water from the city water supply for washing purposes and in which means are employed for heating, circulating and recirculating and reheating the said water each time it is circulated.

Still another object of my invention is to provide an automatically operated dish washing apparatus of the class described, which shall include novel drain valve means, together with novel means for operating the same effect a prerinsing and final rinsing operation.

A further object of my invention is to provide a novel and improved dish washing machine which is simple in design, contains a minimum of parts with maximum and highly efficient use of each part, which may be constructed at relatively low cost, and which is automatic in operation.

Other objects and advantages of my invention will hereinafter be pointed out or will become apparent from the following description of a preferred embodiment thereof as illustrated in the accompanying drawings, and in which.

In order to understand clearly the nature of the invention, reference may now be had to the drawings, in which like numerals denote similar parts throughout the several views.

Figures 1, 2:
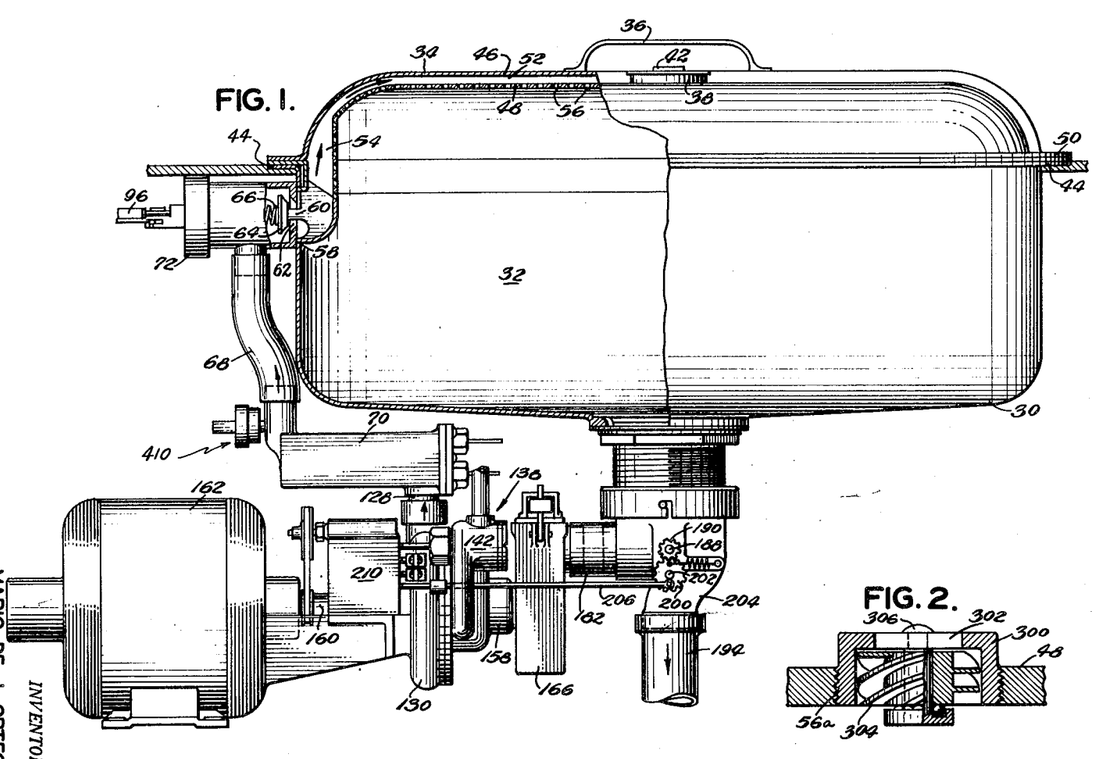
Figure 1 is an elevational view of my dish washing machine as installed in connection with a sink in which the dishes are to be placed to be washed, portions of the view being broken out for clarity of illustration.
Figure 2 is an enlarged sectional view of a modified form of spray nozzle for use in the cover of the device.
Figure 4:
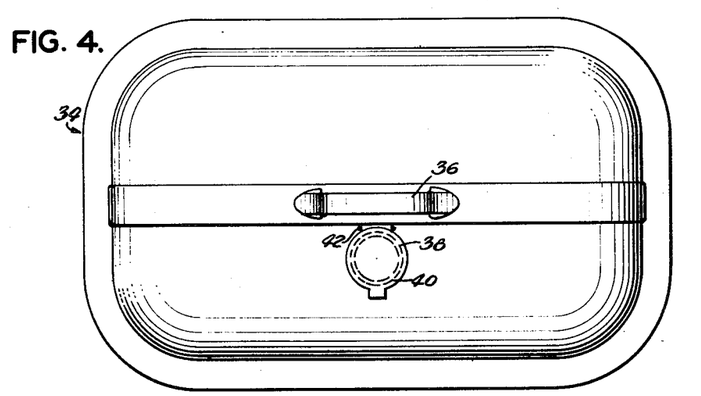
Figure 4 is a top plan view of the cover member of the device shown in Figure 1, but reduced in size.

As seen best in Figures 1 and 4, the device of my invention employs a sink 30 of usual or standard construction having a water chamber 32 for the reception of dishes to be washed therein. Any suitable wire rack of known construction may be disposed inside the sink chamber 32 if desired, upon which the dishes may be supported in the usual manner to facilitate their washing and drying. The chamber 32 is closed at the top by means of a cover member 34 having a handle 36, and having an opening 38 in the top wall thereof through which soap or suitable detergents may be dropped into the sink chamber 32 for washing purposes. The opening 38 may be provided with a small cap 40 hinged at 42 to keep it normally closed.

Figures 7, 8, 9:
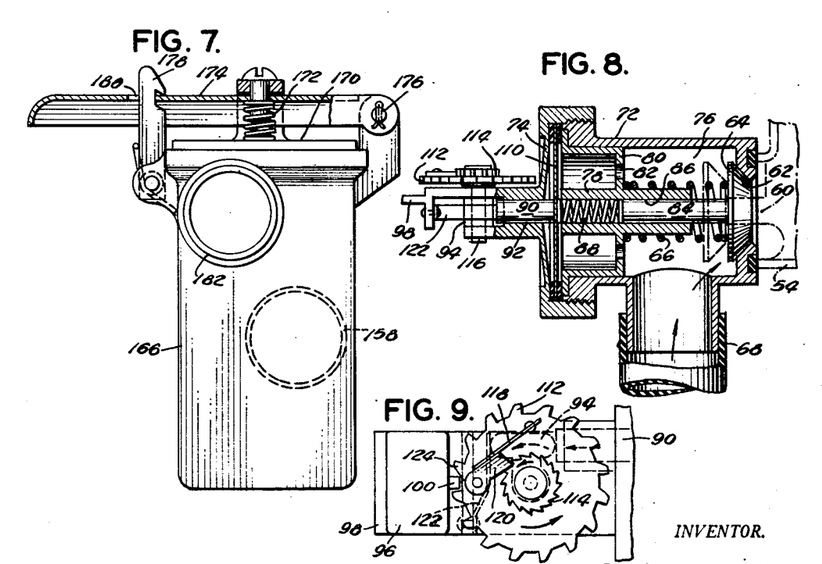
Figure 7 is a cross-sectional view taken substantially along the line 7—7 of Figure 3.
Figure 8 is an enlarged detail sectional view of the valve and switching arrangement for admitting water to the sink cover, as shown at the upper left part of Figure 1.
Figure 9 is an enlarged fragmentary top plan view of a portion of the device shown in Figure 8.

From Figure 1 it will be seen that the cover member 34, which is designed to be seated upon the rim 44 of the sink tub, is so designed that at a certain area thereof extending in a band longitudinally across the cover, it has inner and outer walls 46 and 48 which are spaced from each other at all points except where they join at the rim of the cover member, at 50, so that a relatively narrow longitudinal chamber 52 is formed. An entry duct 54 affords communication with this chamber 52, and allows rinse and/or soapy water which enters the liquid conduit or duct 54 from the left as seen in Figures 1 and 8 and in the manner which will be more fully described hereinafter, to flow into the chamber 52, from which such water is sprayed downwards over the dishes in the sink chamber 32, through spray nozzles such as shown in Figure 2 or suitable openings 56 formed through the wall 48 of the cover member 34.

An opening is formed in the side wall of the sink tub 30, at 58 as seen in Figure 1, and the inlet end of the duct 54 is adapted to overlie this tub opening 58 when in operative position as shown. A central projection or post 60 is set into the mouth of the inlet duct 54 in such manner as not to interfere with water flow therethrough, and is adapted to extend into the valve opening 62 which forms a valve seat for the valve plunger 64, the post 60 thus pressing the valve plunger 64 to the left against the action of the spring 66, so as to unseat the valve, permitting water which had entered valve housing 72 to enter the duct 54. It is apparent that water can only flow through the valve opening 62 when the cover member 34 is in proper position on the sink, and that otherwise the spring 66 normally keeps the valve closed. This soapy and clear water is brought to the valve housing 72 through the liquid supply pipe or standpipe 68 from a water heater 70, which is shown in detail in Figures 12 and 13.

Referring again to Figures 8 and 9, it is seen that there the valve housing 72 is closed at one end by a wall 74 to define a chamber 76 in which is disposed a central tube 78 centered by an integral disc 80 apertured at 82 and having a portion encircled by the bias spring 66. The valve plunger 64 has a shaft 84 slidable in the bore 86, and a spring 88 is disposed in the bore 86 as shown, between the left end of the shaft 84 and the right end of a cam follower 90 which is slidable in the bore 92 and which protrudes outwardly towards the left as seen in Figure 8 for engagement with a cam member 94. A microswitch 96 of usual standard construction, mounted on the frame extension 98 has a push button 100 which is to be actuated at a predetermined portion of the operating cycle of the machine. The microswitch 96 is also shown diagrammatically in Figure 5 so its function can be understood. A flexible disc diaphragm 110 is seated at its edges as seen in Figure 8, the shaft 90 abutting the outer surface thereof and the spring 88 abutting the inner surface. Large and small sprockets 112 and 114, are, respectively, rotatably carried by and keyed to the shaft 116 which is carried by the frame extension 98 as seen in Figures 8 and 9. The cam 94 is also keyed to the shaft 116 for rotation therewith and with said small sprocket 114. A spring 118 normally biases a dog 120, which is pivotally carried by the large sprocket 112, into engagement with the teeth of the small sprocket 114. It will thus be recognized that outward movement of the shaft 90 (to the left, as viewed in Figures 8 and 9) will engage and cause the cam 94 to rotate the shaft 116 which, in turn, will cause rotation of the small sprocket 114 which is also keyed to the shaft 116. Because of the engagement of the dog 120 with the sprocket teeth, this rotation of the small sprocket also causes rotation of the large sprocket 112 on which the dog 120 is pivotally mounted. Due to the limited travel of the shaft 90, the large sprocket 112 is only rotated to the extent that a single sprocket tooth is moved past the push button 100 to momentarily close the switch 96. When the cover is removed at the end of the operating cycle, the pressure of the spring 88 against the diaphragm 110 is relieved so that the shaft 90 may be moved inwardly under the action of the cam 94 which is urged to rotate counterclockwise under the pressure of the reset spring 122. The counter-clockwise movement of the cam 94 which is keyed to the shaft 116 also causes counter-clockwise rotation of the small sprocket 114 which is similarly keyed to the shaft, while the large sprocket 112 remains stationary due to its rotatable mounting on the shaft 116. The small sprocket 114 is thus rotated sufficiently to permit the dog 120 to engage the next tooth of the sprocket 114 whereby subsequent outward movement of the shaft 90 is operative to cause the entire aforementioned cycle to be repeated. Both sprockets 112 and 114 are adapted to turn in the same direction, that is, counterclockwise as seen in Figure 9, and it is seen that as the tooth 124 of the large sprocket 112 moves past the switch button 100, it will depress the button and actuate the switch 96, the switch button 100 returning to outermost position when it has passed the tooth 124 and in a position to be actuated by the next succeeding tooth. The normally open starting switch 96 is thus momentarily closed. It will thus be recognized that once the cycle is started by having placed the cover in place, water will flow into the associated valve housing 72 and through the apertures 82 to act against the diaphragm 110. Fluid pressure will, thereby, maintain the shaft 90 in its outermost position so that once the cycle has started the system does not depend upon the inward thrust of the shaft 84 to prevent the aforementioned reset mechanism of the switch 96 from operating. Thus, in the event that the cover 34 is removed subsequent to the energization of the operating mechanism, its removal and replacement will not cause the reset mechanism to re-start the cycle. To the contrary, the cycle will continue to run except that during the time the cover is removed, no fluid will flow through the closed valve opening 62. Accordingly, the reset mechanism will only operate when both the cover 34 is removed from its operating position and the flow of fluid into the chamber 76 has ceased, whereupon the entire operating cycle may be repeated by merely replacing the cover to cause actuation of the switch 96 in the aforementioned manner.

Figure 12:
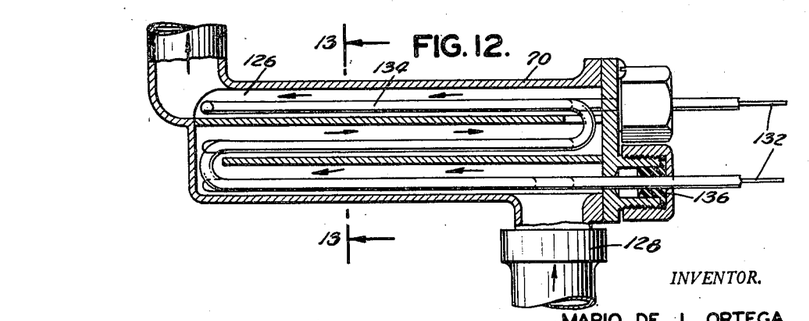
Figure 12 is an enlarged sectional view of the water heating device employed in this machine, and shown in Figure 1.
Figure 13:
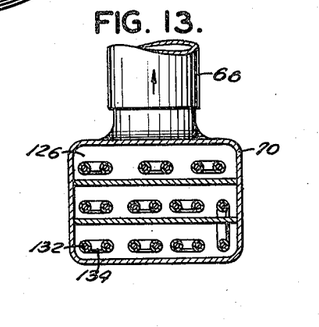
Figure 13 is a cross-sectional view taken substantially along the line 13—13 of Figure 12.
Figure 14:
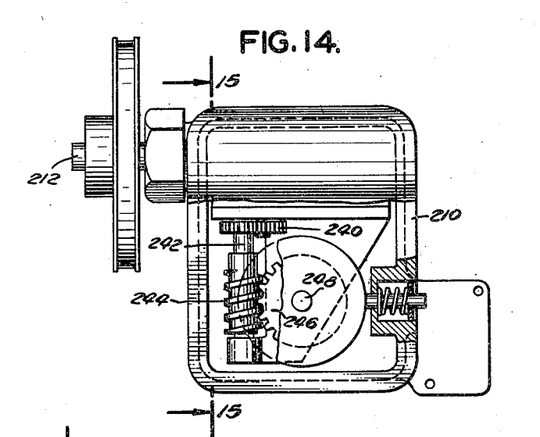
Figure 14 is a partly broken out plan view as seen along the line 14—14 of Figure 3.

Referring now to Figures 12 and 13, it is seen that the water heater housing 70 has an inner chamber 126 into which water flows from inlet 128 from a pump 130 of any well known desirable construction. Heating wires 132, suitably insulated and extending through pipes 134 are disposed in the path of the water flowing through the heater housing 70, so as to heat the water, the ends of the wires 132 extending outwardly as seen in Figure 12 through suitable bushings 136 and connected to a suitable source of electrical supply.

Figure 3:
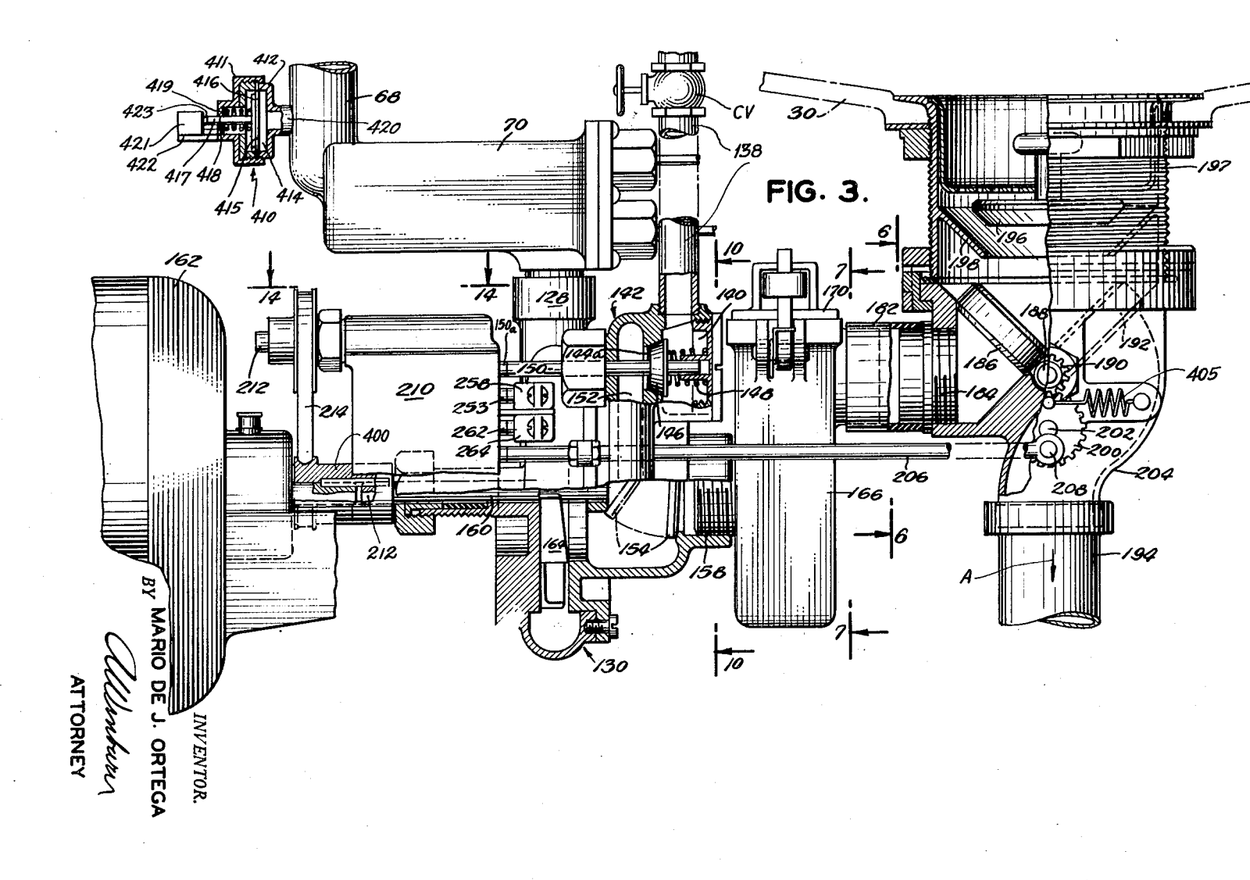
Figure 3 is an enlarged view of the lower portion of Figure 1, with certain parts of the mechanism broken away to disclose the interior construction thereof.
Figure 10:
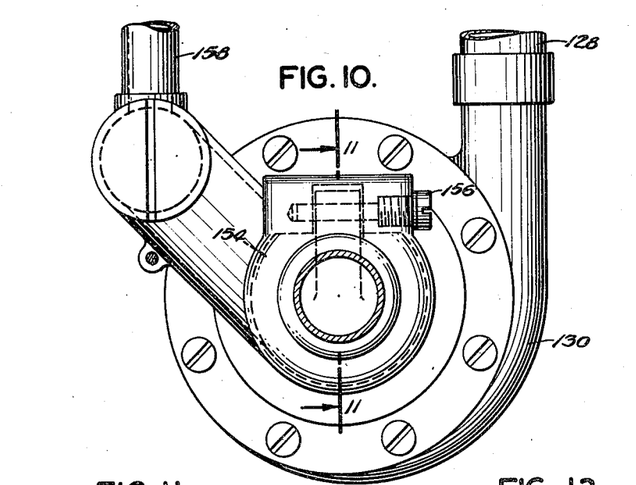
Figure 10 is an enlarged sectional view taken substantially along the line 10—10 of Figure 3.
Figure 11:
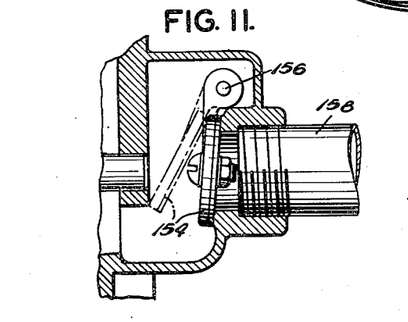
Figure 11 is a detail sectional view showing in greater detail the valve in Figure 3 which is marked "154".

Fresh water from the city supply enters the system through the water inlet pipe 138 shown in Figures 1 and 3, and flows into the vestibule 140 of the valve housing 142, through the valve opening 144a when the fresh water supply valve 146 is unseated against the closing bias of the spring 148. The valve 146 is mounted on a shaft 150 for axial movement with a cam follower shaft 150a. The water having flowed through the valve opening 144a enters the conduit 152 and flows downwardly past the flap type bypass valve 154 causing the said flap valve 154 which is mounted on the pivot pin 156 (see Figure 11) to overlie the inlet opening from the pipe 158 which normally conducts circulating water from the sink drain thereto. From Figures 3, 10 and 11, it is seen that when circulating water from the drain is flowing to the pump 130, the flap valve 154 is in its dotted line position shown in Figures 3 and 11, to allow the drain water from the sink to reach the pump. At the same time the flow of water from the drain will hold the said valve 154 in its dotted line position and hence impede the flow of water from the drain valve to the conduit 152 leading to the city water supply. When the valve 154 is down so as to close the inlet from pipe 158, then the fresh city water from pipe 138 to the pump is prevented from backing up to the drain through the opening 158. The pressure of the city water is sufficient to flip the flap valve 154 to its full line position.

The pump 130 may be of the centrifugal type, with a shaft 160 which is directly coupled to the motor 162 for rotation thereby by a sleeve 400 and has blades 164 mounted on the shaft 160 for rotation therewith, within the pump housing. It is clear that water entering the pump inlet is whirled by the blades and by centrifugal force pumped out of the discharge outlet of the pump into pipe 128, from which it is carried through the heater 70 and into the chamber 52 of the washer cover for spraying over the dishes in the sink tub as hereinbefore described.

As seen in Figures 1, 3 and 7, the water from the sink drain flows through a strainer housing 166 which has suitable mesh strainers disposed therein of the type known to the art for filtering out any solid or semi-solid material in the drain water and retaining it in the strainer housing, allowing the cleared water to flow on through duct 158 and past the flap valve 154. The strainer housing as shown in Figure 7 has a cap 170 held in position by means of a spring 172 which in turn is held down by the locking lever 174 which is pivoted at 176 at one end and held down in closed position by the latch 178 extending through a slot 180 in the lever 174.

Figure 6:
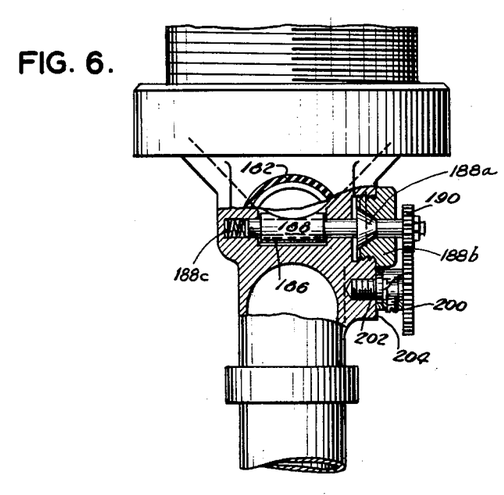
Figure 6 is a cross-sectional view taken substantially along the line 6—6 of Figure 3.

Water enters the strainer housing 166 through the duct 182 from the sink drain outlet, through valve opening 184, when the valve closure 186 is in valve open position. The valve closure 186 is mounted on the shaft 188 so as to be turnable thereby from open to closed position and back again. The shaft 188 is provided with a cone-shaped sealing portion 188a fitting into a correspondingly shaped valve seat area in a nut 188b threadedly received in the housing 204. A spring 188c housed in the shaft opening normally urges the valve 188a against its valve seat. As seen in Figures 1, 3 and 6, a gear 190 is mounted on the shaft 188 for turning the same and the valve closure 186 between its normal, solid line position or valve closed position shown in Figure 3, and the open, dotted line position 192 at which the drain water is free to enter the strainer housing 166 from the sink drain. When in valve closed position, as seen in Figure 3, the drain water may then flow downwards in the direction of arrow A to the house sewer connections and is not recirculated. This would occur only if the valve 196 shown thereabove in the coupling 197 is unseated from the valve seat 198 to allow water to leave the sink 32. This upper portion of the drain comprising the parts 196 through 198 is of well known standard construction in general use in connection with sinks.

The gear 200 intermeshes with the gear 190 and is mounted rotatably on the shaft 202 carried by the housing 204. A cam follower 206 engages a crank pin 208 mounted on the gear 200, so that movement of the cam follower causes turning of the gear 200 and hence of the valve closure 186 from open to closed positions and back again as the follower is actuated.

A synchronizer housing is shown at 210, and in sectional details in Figures 14 through 20. This synchronizer has a shaft 212 journaled therein and is driven from the motor 162 by means of a belt 214 engaging a V-pulley integral with the sleeve keyed to the motor shaft and the pump shaft 160. A worm 216 is mounted on the shaft 212 for rotation therewith and engages a gear 218 mounted on the shaft 220 for turning the same. The shaft 220 is journaled in the interior wall 222 of the housing 210 and carries a gear 224 mounted thereon for rotation therewith. The gear 224 turns the gear 226 which is mounted on shaft 228 journaled in wall 230 of the housing, and a gear 232 is mounted on the shaft 228 for rotation with gear 226. The gear 232 turns gear 234 which is mounted on shaft 236 journaled in the wall 230 and carries gear 238 for rotation therewith. The gear 238 drives gear 240 which is mounted on shaft 242 for rotation therewith, the shaft 242 being journaled in the housing walls as shown. A worm 244 is mounted on shaft 242 for rotation therewith and turns the gear 246 seen best in Figure 14, the gear 246 being mounted on cam shaft 248 for rotation therewith.

Figures 15, 16, 17, 18, 19, 20:
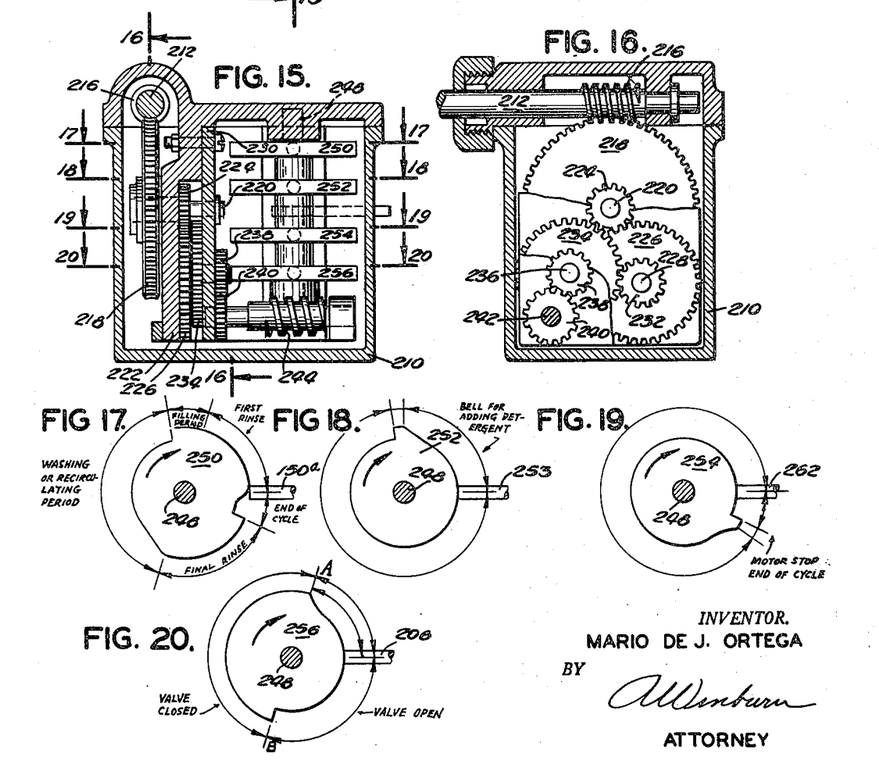
Figure 15 is a cross sectional view taken substantially along the line 15—15 of Figure 14.
Figure 16 is a cross-sectional view taken substantially along the line 16—16 of Figure 15.
Figures 17, 18, 19 and 20 are sectional views of the cams and followers only, taken substantially along the lines 17—17, 18—18, 19—19 and 20—20 respectively, of Figure 15.

Four cam wheels 250, 252, 254, and 256 are mounted on the camshaft 248 for rotation therewith, the cams being spaced from each other in the manner shown in Figure 15. Each cam wheel has cam surfaces so arranged as shown in Figures 17, 18, 19 and 20, for actuating their respective cam followers which are shown in each view with the cam surfaces. Looking at these views, Figure 15, Figures 3 and 5, it is seen that the first cam 250 turns with shaft 248, causing its cam follower 150a to follow its surface, closing the city water supply inlet at the depressed portions of the cam surface, and opening it to allow water to enter through pipe 138 on the raised portions of the cam surfaces, the portions of the cycle being marked in Figure 17. Cam 256 is shown in Figure 20, with its cam follower 206, and when the depressed portions of the cam between locations A and B are in contact with the cam follower, the valve 186 is in full line position to open the drain and when the raised portions of the cam surfaces are in contact with the cam follower, the valve 186 is in the dotted line position, 192 to recirculate the fluid.

Figure 5:
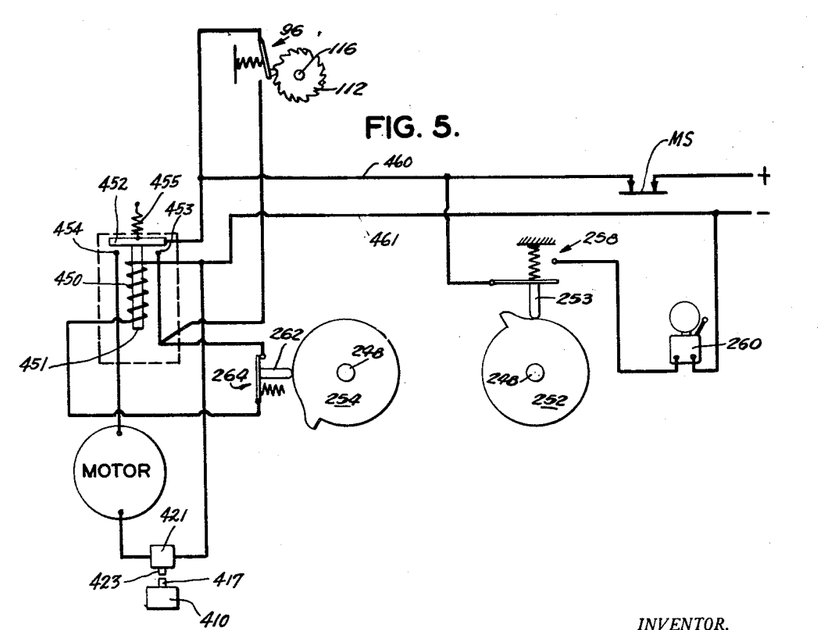
Figure 5 is a schematic circuit diagram showing certain of the switching details and the cam members cooperating therewith.

Cam 252 is shown in Figure 18 and the circuit diagram Figure 5. The cam follower 253 actuates the normally open switch 258 when the high point of the cam is reached, to ring the bell 260 at the point when the detergent should be added through the opening 40 in the cover member 34. The cycle of operation which will hereinafter be more fully described is such that when the cam follower 253 is again actuated by the action of the cam 252 the second ringing of the bell will indicate the end of the cycle and the completion of the washing operation. Cam 254 is shown in Figure 19 and Figure 5, and its cam follower 262 is actuated at the high point of the cam to actuate the normally closed switch 264, to open the same, deenergizing the motor at the end of the cycle. It will be recognized that although the motor is deenergized, there will be a short coasting period before it comes to rest, during which time the high point of the cam 254 will have rotated out of engagement with the follower 262 to enable the motor to be started again during the next cycle. It is apparent however, that the cover 34 must be placed on the sink to close the switch 96 before the motor can be started again.

Figure 2 illustrates a modified form of spraying device which is set into an opening 56a in the cover member 48. It is seen to be a cylindrical housing 300 threaded into the opening 56a and having a slit or opening 302 to receive the liquid from the passage 52. A helical screw like rotor 304 has a vertical axial pin 306 about which it rotates freely as upon ball bearings shown and carried in the housing 300. The force of the pressurized liquid rotates the rotor, making an efficient spray of the liquid downward. Such rotors are quite effective, and only a few will suffice for the purpose.

Having described the constructional details of my device for washing dishes, I will now describe the complete cycle of operation to effectively wash a quantity of dishes, or the like articles.

The articles to be washed are first arranged in a holding tray or support of any well known type generally employed by housewives for stacking dishes, such as, for example, a wire tray, and the loaded tray then placed into the sink chamber 32 to rest on the bottom wall thereof. The cover 34 is then placed in its proper position over the sink chamber by first causing its projecting member 60 to press up against the valve 64, forcing it open against the action of the spring 66. The remainder of the cover 34 is then seated to rest evenly on the top flange 44 of the sink. The action of thus placing the cover member 34 in position on the sink closes the switch 96 (see Figure 5) to close the circuit energizing the motor which starts operating as will be explained hereinafter.

As the motor operates, synchronizer cam 250 automatically causes the inlet valve 146 to open against the action of spring 148 permitting fresh water from the city supply to enter and be pumped through the recirculating system during which it passes through the heater unit 70, where it is heated and from there, through the conduit 68 to the valve housing 72 and thence to the cover channel or chamber 52 and out through the diffusers to be sprayed with great force downwardly on the articles in the sink chamber, rinsing the said articles, the said water thereafter passing to the sewer, since the drain valve member is still in the full line position 186 shown in Figure 3. This is the beginning of the pre-rinse operation which washes away all food particles and other foreign matter which might have been left on the dishes when they were scraped preparatory to stacking for the washing operation. After a predetermined period of operation for prerinsing, synchronizer cam 256 is actuated to shift the drain valve member 186 from its normal full line closed position shown in Figure 3 to its dotted line open position at 192, against the action of the restoring spring 405, thus closing the orifice from the drain to the sewer and opening the orifice 184 to the recirculating system. At this point in the operation synchronizer cam 252 automatically causes a bell to ring to indicate that it is time to insert the detergent or soap through the opening 38 in the cover 34. With the orifice to the sewer of the drain valve being closed, and the water from the city supply still flowing into the recirculating system, there will collect a supply of water in the sink chamber. When after a given time the water level in the sink chamber reaches a height of about three or four inches, inlet valve 146 is closed by the action of the cam 250 and the spring 148 to shut off the supply of fresh city water. At this point the period of recirculation and washing begins and is continued for four minutes during which time the detergent laden water is constantly being recirculated. Each time the water is recirculated it passes through the heater 70 and thus successively becomes hotter and hotter. The pressure of the hot water spray on the dishes thoroughly cleanses them.

When the four minute washing period is over synchronizer cam 256 again shifts the drain valve member 186 back to its full line position shown in Figure 3 to close the orifice 184 leading to the circulating system, thus allowing all the detergent laden water to flow out from the sink chamber, through the drain and to the sewer. After a predetermined period of operation the used water is completely drained off and at this point the synchronizer cam 250 again opens the valve 146 letting in the fresh city water which enters the system and is heated and then caused to spray the washed dishes with the fresh clean water to thoroughly rinse them, the said water, after rinsing passing out to the sewer through the orifice in the drain valve and the outlet conduit or pipe 194. When this final period of rinsing is over, synchronizer cam 252 again causes the bell to ring to indicate that the washing cycle has been completed and simultaneously therewith synchronizer cam 254 breaks the circuit to stop the motor. The cover may then be lifted off the sink and the dishes removed. Due to the fact that the washing has been done with hot water, the dishes dry without wiping.

It is noted that the usual precautions necessary are taken to prevent any of the water in the circulating system from backing up into the city water supply system by providing a check valve CV of usual standard construction as shown in Figure 3 of the drawings.

In accordance with my invention I have provided the following safety means for insuring against too great a pressure being built up in the circulatory system if the cover should be removed for any reason, which would tend to close the valve 64, while the pump is still operating, or at any other time when the pressure reaches a predetermined amount:

As noted in Figures 1 and 3, I provide a safety valve 410 comprising a first housing part 411 and a second housing part 412 threadedly interconnected to form a chamber 414. Across the chamber 414 is a suitable diaphragm member 415 against which there is placed a disc 416 to which is attached an axially movable rod 417 projecting beyond the housing part 411 through an opening 418. A spring 419 encircling the rod 417 is of such strength as to withstand the movement of the disc 416 due to a desired limit of pressure against the diaphragm 415 because of the pressure of the water in the circulatory system. The housing part 412 has a tubular portion 420 communicating with the conduit 68 and it is thus seen that the water being circulated enters the chamber 414 and presses up against the diaphragm 415. When the pressure in the circulatory system builds up beyond a certain desired amount, the diaphragm 415 will press against the disc 416 to axially move the rod 417 against the action of the spring 419. A micro switch 421 of usual standard construction is mounted on a bracket 422 fixed to the housing part 411 of the valve 410. The micro switch 421 is provided with an operating pin 423 lying directly in the path of axial movement of the rod 417. Upon such movement of the rod 417, as above described the micro switch will, by suitable wiring connections, be actuated to open the switch (see Figure 5) to break the circuit from the power source, thus stopping the motor, and thereby stopping the operation of the pump. Once the trouble has been corrected, the micro switch 421 is reset by retraction of shaft 417 from member 423.

In accordance with my invention I have provided the following means whereby, after the motor has been started operating, in the event it is desired to momentarily remove the cover for the addition of dishes to the stack to be washed or for any other reason, the act of removing the cover will not stop the operation of the motor nor interrupt the cycle of washing operation.

Referring to Figure 5 it is noted that when the main switch MS is closed and the cover 34 properly positioned to close the switch 96, coil 450 surrounding the armature 451 will be energized to cause the said armature 451 to be moved downwardly to cause the switch bar 452 to move from its normal position shown to make contact with the contact members 453 and 454 against the action of the spring 455. Thereafter the circuit from the source of power supply through the coil 450 and switch 452 being completed through the lead lines 460 and 461 will hold the motor circuit closed to continue the operation of the motor until the switch 264 is opened by the control cam 254, at which time the relay coil 450 is deenergized. Renewed operation of the device is then possible only when the micro-switch 96 is again actuated to start the next complete operating cycle.

Although I have described a preferred embodiment of my invention in specific terms, it will be understood that various changes may be made in the size, shape, materials and arrangement without departing from the spirit and scope of the invention as claimed.

I claim:

1. An automatic dish washing device comprising: a walled receptacle adapted to receive dishes to be washed; removable closure cover means adapted to engage the walls of said receptacle and form a closed chamber therewith; liquid conduit means associated with the interior of said chamber and adapted to receive pressurized liquid and to discharge liquid upon dishes in said chamber; a drain outlet communicating with said chamber and so disposed as to drain the liquid contents thereof into an outlet conduit; a drain valve in said drain outlet and being operative in normally closed position to permit the flow of liquid into said outlet conduit; liquid supply means associated with said liquid conduit means; a pump associated with said liquid supply means for delivering liquid under pressure from the outlet of said pump to said liquid conduit means; liquid circulation conduit means affording communication between the inlet of said pump and said drain outlet; a by pass valve associated with said liquid circulation conduit and interposed between the inlet of said pump and said drain outlet; a fresh water supply conduit also associated with said by pass valve and communicating with the inlet of said pump through said by pass valve; a normally closed supply valve for controlling the flow of fresh water through said by pass valve; said by pass valve being operative to block the flow of liquid from said outlet to the inlet of said pump during the flow of fresh water through said by pass valve into the inlet of said pump; and automatic control means for regulating the cyclic operation of said supply valve and said drain outlet valve.

2. An automatic dish washing device as set forth in claim 1 and further comprising a normally closed inlet valve interposed between said liquid supply means and said liquid conduit means; and means associated with said removable closure cover means to open said inlet valve in response to the engagement of said cover means with the walls of said receptacle to form a closed chamber therewith.

3. In a dish washing apparatus wherein a sink is employed to receive dishes to be washed, a drain outlet on said sink, a cover for said sink forming a closed chamber therewith, double walls spaced from each other in said cover to form a liquid conduit, with spray nozzle openings formed in said cover for discharging upon said dishes liquid therefrom, liquid inlet means connectable with said cover to conduct liquid thereto, normally closed first valve means disposed in said liquid inlet means and automatically brought into operation to open upon placing of said cover member in covering position, main liquid duct means connecting said sink drain outlet with said liquid inlet means to conduct recirculated liquid thereto, pump means disposed in said main liquid duct means to pressurize said liquid, fresh water inlet means connectable between a source of fresh water and said fresh water pump means to conduct fresh water thereto, fresh water valve means for controlling flow of fresh water into said system, cam means for actuating said fresh water valve means at predetermined portions of the operating cycle of said device to introduce fresh water into the system, first by-pass means for blocking the flow of water in the recirculating system during the period that fresh water is flowing through said fresh water inlet means, means for heating said liquid during the flow thereof, and means for straining said liquid upon outflow from said sink chamber for cleaning the same.

4. The construction according to claim 3, characterized further in that said drain outlet is connected to both said liquid straining means and to the sewer connections of the building in which said apparatus is installed, second by pass valve means for controlling the direction of flow of said liquid from said drain outlet as desired, to said liquid straining means and to said sewer connections respectively according to a predetermined pattern, and second cam means for controlling the operation of said second by pass valve means according to said predetermined pattern, whereby, at a certain period of said cycle of operation, said liquid from said chamber is recirculated and sprayed again upon said dishes from above, and wherein at another period of said cycle of operation, said liquid is caused to be drained out of the chamber and into said sewer connection.

5. In a dish washing apparatus wherein a kitchen sink is employed for receiving dishes therein to be washed, the combination of first liquid conduit means adapted to be connected to a source of liquid supply, second conduit means communicating with said first liquid conduit means and with said sink, a drain outlet in said sink, third liquid conduit means connecting said drain outlet with a sewer system, a drain valve member interposed between said drain outlet and said third liquid conduit means, said drain valve member having a first outlet communicating with said third liquid conduit means, said drain valve member having a second outlet, fourth liquid conduit means interconnecting said second outlet of said drain valve member with said second liquid conduit means, and means in said drain valve member for selectively closing either said first or second outlets, said last named means comprising a first valve seat associated with said first outlet, a second valve seat associated with said second outlet, a single valve designed to be received by either said first or second valve seat to close either said first or second outlet, a pivot shaft, said single valve being mounted on said pivot shaft for pivotal movement and means comprising intermeshing gears and a spring for normally causing said single valve to pivotally move in a direction whereby to maintain said single valve on said second valve seat to normally close said second outlet.

6. The combination according to claim 5 further comprising a removable cover member for said sink adapted to form a closed chamber with said sink, fifth liquid conduit means in said cover member, spray outlets in said fifth liquid conduit means adapted to spray liquid from said fifth liquid conduit means in a downward direction in said chamber, normally closed valve means blocking the flow of liquid from said second liquid conduit means to said sink and means whereby the placing of said cover member on said sink will automatically open said normally closed valve means and will at the same time block passage of liquid from said second liquid conduit means to said sink and cause direct communication between said fifth and said second liquid conduit means to permit liquid from said source of supply to enter said fifth liquid conduit means to pass through said spray outlets.

References Cited in the file of this patent

UNITED STATES PATENTS

| | | |
|---|---|---|
| 1,583,710 | Welch | May 4, 1926 |
| 1,645,815 | Murdoch | Oct. 18, 1927 |
| 1,670,611 | Couch | May 22, 1928 |
| 1,717,229 | Kraeft | June 11, 1929 |
| 1,737,794 | Henderson | Dec. 3, 1929 |
| 1,757,278 | Weidman | May 6, 1930 |
| 1,995,636 | Clark | Mar. 26, 1935 |
| 1,995,927 | Kirby | Mar. 26, 1935 |
| 2,066,232 | Schmidt | Dec. 29, 1936 |
| 2,157,112 | Bonner | May 9, 1939 |
| 2,197,382 | Murphy | Apr. 16, 1940 |
| 2,216,388 | Hampel | Oct. 1, 1940 |
| 2,218,942 | Webber | Oct. 22, 1940 |
| 2,368,563 | Palmieri | Jan. 30, 1945 |
| 2,440,161 | Vaudreuil | Apr. 20, 1948 |
| 2,471,506 | Wiswall | May 31, 1949 |
| 2,480,931 | Jaeger | Sept. 6, 1949 |
| 2,575,704 | Clark | Nov. 20, 1951 |

FOREIGN PATENTS

| | | |
|---|---|---|
| 507,273 | Germany | Sept. 13, 1930 |
| 529,986 | Great Britain | Dec. 3, 1940 |
| 584,827 | Great Britain | Jan. 23, 1947 |
| 853,976 | France | Dec. 23, 1939 |